(12) United States Patent
Shanmugam et al.

(10) Patent No.: US 10,917,571 B2
(45) Date of Patent: Feb. 9, 2021

(54) IMAGE CAPTURE DEVICE CONTROL BASED ON DETERMINATION OF BLUR VALUE OF OBJECTS IN IMAGES

(71) Applicant: SONY CORPORATION, Tokyo (JP)

(72) Inventors: Sankar Shanmugam, Bangalore (IN); Prashanth Puttamalla, Bangalore (IN); Ashwin Kulkarni, Bangalore (IN); Madhvesh Sulibhavi, Bangalore (IN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/180,178

(22) Filed: Nov. 5, 2018

(65) Prior Publication Data

US 2020/0145583 A1 May 7, 2020

(51) Int. Cl.
*H04N 5/232* (2006.01)

(52) U.S. Cl.
CPC ..... *H04N 5/23267* (2013.01); *H04N 5/23216* (2013.01); *H04N 5/23277* (2013.01); *H04N 5/232125* (2018.08)

(58) Field of Classification Search
CPC .......... H04N 5/23267; H04N 5/23277; H04N 5/232125; H04N 5/23216; H04N 5/272; H04N 5/23218; H04N 5/23293; H04N 5/232933; H04N 5/232935; H04N 5/232945; H04N 5/2625; H04N 5/265; H04N 5/23264; H04N 5/23229; H04N 5/23212; G06K 9/627; G06K 9/342;
(Continued)

(56) References Cited

U.S. PATENT DOCUMENTS

| | | | |
|---|---|---|---|
| 9,467,614 B2* | 10/2016 | Park | H04N 5/23212 |
| 9,836,484 B1 | 12/2017 | Bialynicka-Birula et al. | |
| 10,116,867 B2* | 10/2018 | Blonde | G06T 7/0002 |

(Continued)

FOREIGN PATENT DOCUMENTS

| | | | |
|---|---|---|---|
| CN | 103052960 A | 4/2013 | |
| CN | 107343081 A | 11/2017 | |

(Continued)

OTHER PUBLICATIONS

Yu, et al., "A Shallow Convolutional Neural Network for Blind Image Sharpness Assessment", May 1, 2017, 12 pages.

(Continued)

*Primary Examiner* — Shahbaz Nazrul
(74) *Attorney, Agent, or Firm* — Chip Law Group

(57) ABSTRACT

An image processing device is disclosed. The image processing device controls an image capture device to capture at least first image that comprises one or more objects. The image processing device identifies at least a first object in the first image. The image processing device determines a first blur value of identified first object and determines the identified first object as a blur object based on the first blur value. The image processing device adjusts a focal point of the image capture device to focus on the blurred first object. The image processing device controls the image capture device to capture a second image of the first object based on adjusted focal point. The image processing device replaces the first object in first image with the first object in the second image to generate an output image and further controls the display screen to display well-focused output image.

19 Claims, 8 Drawing Sheets

(58) Field of Classification Search
CPC ............. G06K 9/3233; G06K 9/00671; G06K 9/00362; G06T 11/60
See application file for complete search history.

(56) References Cited

U.S. PATENT DOCUMENTS

| | | | |
|---|---|---|---|
| 2007/0116447 A1* | 5/2007 | Ye | G03B 13/34 396/79 |
| 2007/0216796 A1* | 9/2007 | Lenel | H04N 5/2251 348/345 |
| 2008/0002961 A1* | 1/2008 | Sundstrom | G03B 13/30 396/133 |
| 2008/0131019 A1* | 6/2008 | Ng | G06T 5/50 382/255 |
| 2008/0166116 A1* | 7/2008 | Tsuchiya | G03B 13/34 396/89 |
| 2009/0002478 A1 | 1/2009 | Ueki | |
| 2009/0059023 A1* | 3/2009 | Sasaki | G06K 9/00228 348/222.1 |
| 2010/0128163 A1* | 5/2010 | Nagasaka | H04N 5/23212 348/348 |
| 2010/0265346 A1* | 10/2010 | Iizuka | G06T 5/50 348/218.1 |
| 2011/0175993 A1* | 7/2011 | Uemori | H04N 5/23212 348/79 |
| 2012/0113300 A1* | 5/2012 | Hamano | H04N 5/2253 348/241 |
| 2012/0120283 A1 | 5/2012 | Capata et al. | |
| 2012/0147245 A1* | 6/2012 | Iijima | H04N 5/23212 348/333.11 |
| 2013/0329124 A1* | 12/2013 | Nagamatsu | H04N 5/23216 348/349 |
| 2014/0072221 A1* | 3/2014 | Sakai | G06T 7/194 382/173 |
| 2014/0184858 A1 | 7/2014 | Yu et al. | |
| 2014/0193088 A1 | 7/2014 | Capata et al. | |
| 2015/0222810 A1 | 8/2015 | Nagamatsu | |
| 2015/0363634 A1 | 12/2015 | Yin et al. | |
| 2017/0134639 A1* | 5/2017 | Pitts | H04N 5/23212 |
| 2017/0150045 A1 | 5/2017 | Goswami et al. | |
| 2017/0318226 A1* | 11/2017 | Jung | G06T 7/11 |
| 2017/0374269 A1* | 12/2017 | Govindarao | H04N 5/23293 |
| 2018/0184012 A1 | 6/2018 | Kanatsu | |

FOREIGN PATENT DOCUMENTS

| | | |
|---|---|---|
| EP | 2548154 A2 | 1/2013 |
| EP | 3007104 A1 | 4/2016 |
| EP | 3236391 A1 | 10/2017 |
| EP | 3240282 A2 | 11/2017 |
| EP | 3357239 A1 | 8/2018 |
| JP | 2013-254432 A | 12/2013 |
| JP | 5530568 B2 | 6/2014 |
| JP | 6081297 B2 | 2/2017 |
| JP | 2018-107593 A | 7/2018 |
| JP | 2019-505148 A | 2/2019 |
| KR | 10-2013-0139243 A | 12/2013 |
| KR | 10-2014-0088752 A | 7/2014 |
| KR | 10-2017-0123125 A | 11/2017 |
| KR | 10-2018-0067627 A | 6/2018 |
| WO | 2012/062893 A2 | 5/2012 |
| WO | 2016/107962 A1 | 7/2016 |
| WO | 2017/087148 A1 | 5/2017 |

OTHER PUBLICATIONS

International Search Report and Written Opinion of PCT Application No. PCT/IB2019/058623, dated Dec. 19, 2019, 13 pages of ISRWO.

\* cited by examiner

IMAGE CAPTURE DEVICE CONTROL BASED ON DETERMINATION OF BLUR VALUE OF OBJECTS IN IMAGES

CROSS-REFERENCE TO RELATED APPLICATIONS/INCORPORATION BY REFERENCE

None.

FIELD

Various embodiments of the disclosure relate to image processing technologies. More specifically, various embodiments of the disclosure relate to an image processing device and a method to control an image capture device based on determination of blur value of objects in images.

BACKGROUND

Recent advancements in the field of digital image processing technologies have led to rapid increase in quality of images and videos that are captured from different cameras. A captured image may include several identifiable objects (such as humans, animals, and other non-living entities). Typically, in a single image, all the identifiable objects may not be equally focused. Some identifiable objects may appear to be in focus and one or more identifiable objects may appear defocused or blurry in the captured image. Such one or more identified objects may appear blurry due to different factors, such as motion blur, improper adjustment of focus settings of the camera, distance between different identifiable objects and camera, and a level of experience of user in digital photography. In order to capture all the identifiable objects with a desired focus (or sharpness), focus settings may have to be manually adjusted to recalibrate camera to capture an image of a scene with desired objects in focus. Also, as the level of blur changes with miniscule changes in camera parameters, user's hand movements, or movement of the camera, a user has to typically repeat a shot multiple times till a good image is captured where all the desired objects are well in focus. Due to a paucity of time and challenges with respect to the manual adjustment of focus settings, the user may lose an interest in the photography. Thus, an advanced system may be desired to improve the quality of all the identified objects at the time of capture of the image and render an enhanced photography experience to the user.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An image processing device and a method to control an image capture device based on object blur determination in images, as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed device and method for an image capture device control based on determination of a blur value of objects in images. Exemplary aspects of the disclosure provide an image processing device that may control an image capture device to capture an image with all identifiable objects (e.g., user-desired objects of particular object types) well-focused in the captured image.

The disclosed image processing device may control the image capture device to capture a first image (for example, an interim or a preview image). The captured preview image may correspond to a scene that may include one or more objects, such as humans, animals, plants, and other non-living entities. The image processing device may further determine blur values of the one or more objects in the captured first image. The image processing device may further determine at least one object as a blur object from the one or more objects, based on the determined blur values. The image processing device may further automatically adjust a focus of the image capture device by setting a focal point (e.g., a focus point or an autofocus (AF) point) on the at least one object (i.e. a blurry object). The image processing device may further control the image capture device to recapture the first image as a second image, based on the automatic adjustment of the focal point, without any manual intervention required for the adjustment of focus of the image capture device. The blur value of the at least one object (as blur object) in the second captured image may have a better blur value (e.g., a higher Laplacian blur value, i.e. a sharper image) based on the adjusted focus point. The image processing device may further crop the focused object from the second image and replace the focused object (with better blur value) in the first image. The image processing device may further generate an output image based on replacement of the focused object in the first image. The generated output image may be a well-focused image with an improved blur value of each of the one or more objects (i.e. sharper objects in image) initially identified in the first image. The disclosed image processing device may also render enough flexibilities to the user to dynamically select or deselect different type of objects that may be identified in a preview mode to capture an image with only user-preferred objects (or objects of preferred object-types) in focus. Thus, the image processing device generates a user-desired well focused image in a single shot and thereby enhances a photography experience of the user.

Figure 1:
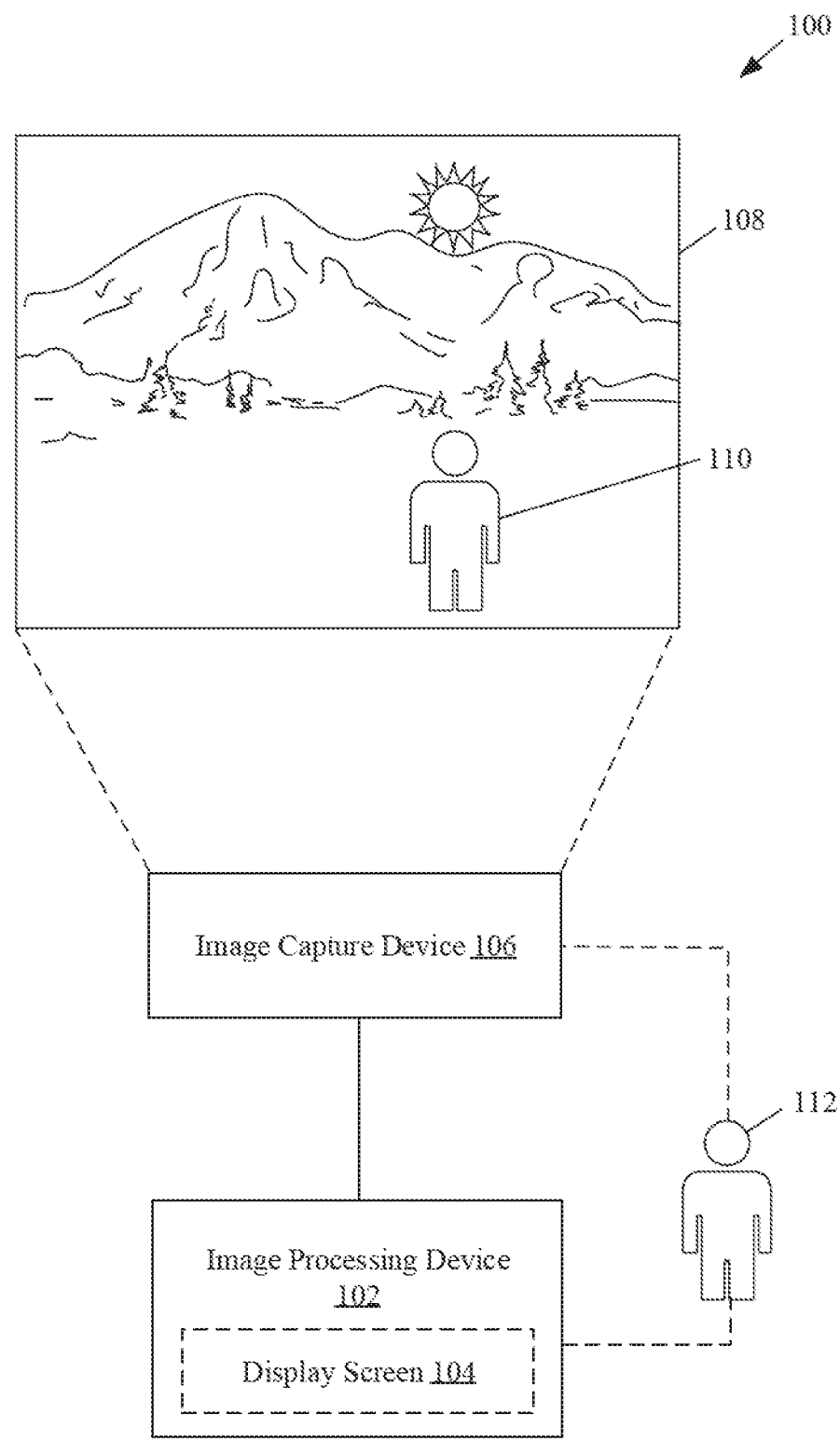
FIG. 1 illustrates an exemplary environment for an image capture device control by an image processing device based on determination of a blur value of objects in images, in accordance with an embodiment of the disclosure.

FIG. 1 illustrates an exemplary environment for an image capture device control by an image processing device based on determination of a blur value of objects in images, in accordance with an embodiment of the disclosure. With reference to FIG. 1, there is shown an exemplary environment 100. The exemplary environment 100 may include an image processing device 102 and an image capture device 106. As shown, a display screen 104 is included in the image processing device 102. However, in some embodiments, the display screen 104 may be an external screen that may be peripherally coupled (or interfaced) with the image processing device 102. There is further shown a scene 108 to be captured by the image capture device 106. The scene 108 may further include one or more objects, such as a first object 110. The image capture device 106 may be held by a user, such as a user 112. As shown, the image processing device 102 may be a separate device that is communicatively coupled to the image capture device 106. However, in some embodiments, the image capture device 106 may be part of (or integrated with) the image processing device 102 as a single device.

The image processing device 102 may comprise suitable logic, circuitry and interfaces that may be configured to control the image capture device 106 to capture an image of a scene (e.g., the scene 108) in field-of-view (FOV) of the image capture device 106. The image processing device 102 may be configured to analyze the captured image to identify one or more objects in the captured image. The image processing device 102 may be configured to determine blur values of the identified one or more objects and further control the image capture device 106 to improve a quality (e.g., sharpness of certain regions) of the captured image based on the determined blur values. The image processing device 102 may be configured to control a display screen 104 to display an output image with the improved quality. Examples of the image processing device 102 may include, but are not limited to, an imaging device (such as a digital camera and a camcorder), a motion capture system, a camera phone, a computer workstation, a mainframe computer, a handheld computer, a cellular/mobile phone, a smart appliance, a video player, a DVD writer/player, a television, and/or other computing device.

The display screen 104 may comprise suitable logic, circuitry, and interfaces that may be configured to display an image captured by the image capture device 106. The display screen 104 may be configured to present different user interfaces (UI) in order to receive one or more user inputs (from the user 112), based on which the image processing device 102 may control the image capture device 106. The display screen 104 may be configured to display an output image processed by the image processing device 102. The display screen 104 may be further configured to display information that corresponds to the one or more objects in the image captured by the image capture device 106. The display screen 104 may be realized through several known technologies, which may include, but not limited to, a Liquid Crystal Display (LCD) display, a Light Emitting Diode (LED) display, a plasma display, and an Organic LED (OLED) display technology, and other display technologies known in the art.

The image capture device 106 may comprise suitable logic, circuitry and interfaces that may be configured to capture the image of a scene (e.g., the scene 108) based on the one or more user inputs received from a user, such as the user 112. The image capture device 106 may be configured to control one or more imaging parameters (for example, focus points/autofocus points, depth of field, plane of focus (POF), camera focal length, exposure area/aperture area, etc.) to capture the image of the scene. Examples of the image capture device 106 may include, but are not limited to, an imaging sensor, a digital camera, a digital camcorder, a bridge camera, a camera phone, a compact camera, a closed-circuit television (CCTV) camera, a dashboard camera, a laptop computer, a tablet, or a smart appliance with an integrated camera.

A person with ordinary skill in the art will understand that the scope of the disclosure is not limited to an implementation of the image processing device 102 and the image capture device 106 as separate entities. In accordance with an embodiment, the functionalities of the image capture device 106 may be implemented by the image processing device 102, without a departure from the scope of the disclosure. In accordance with an embodiment, the functionalities of the image processing device 102 may be implemented by the image capture device 106, without a departure from the scope of the disclosure.

In operation, the image processing device 102 may receive a first user input from a user (e.g., the user 112) to capture a first image of a scene (e.g., the scene 108 in view in front of the user 112) through the image capture device 106. The scene 108 may include one or more objects which may correspond to a living entity (e.g. a human being, an animal, or a plant) or a non-living entity (e.g., a vehicle, a house, a sculpture, or an object without a sign of growth). The scene 108 may correspond to a field-of-view that may be captured by the image capture device 106.

The image processing device 102 may be further configured to control the image capture device 106 to capture the first image based on the received first user input. For example, the user 112 may press a button on the image capture device 106 to capture the first image. The first user input may correspond to at least one of, but is not limited to, a touch input, a voice input, gesture input, or a text input to the image processing device 102.

The image processing device 102 may be further configured to identify a first object (such as, a human shown in FIG. 1) from a plurality of objects in the captured first image. For example, the plurality of objects in the scene 108 may correspond to mountains, trees, sun and a human (as the first object 110). The image processing device 102 may be further configured to identify the first object (and a type of object) in the captured first image based on an object detection and classification technique. The object detection and classification technique may be based on a deep neural network (DNN) architecture, such as, but is not limited to, a convolutional neural network (CNN), a CNN-recurrent neural network (CNN-RNN), R-CNN, Fast R-CNN, Faster R-CNN, or (You Only Look Once) YOLO network.

In accordance with an embodiment, the image processing device 102 may be further configured to determine a blur value (such as, a first blur value) of the identified first object 110 captured in the first image. The blur value of the identified first object 110 may be determined using different imaging techniques. The image processing device 102 may be further configured to determine the identified first object 110 as a blur object (or a sharp object) based on the determined first blur value. In accordance with an embodiment, the image processing device 102 may be configured to compare the determined first blur value with a blur threshold value (BT) to determine the first object 110 as the blur object (or the sharp object). The blur threshold value (BT) may be a predefined blur value stored in a memory (not shown in FIG. 1) of the image processing device 102. The blur threshold value (BT) may be minimum blur value based on which the first object 110 is determined as the blur object (or the sharp object). For example, in case the determined first blur value is equal to or higher than the blur threshold value (BT), the image processing device 102 may determine the identified first object 110 as the sharp object. In another case, the identified first object 110 may be determined as the blur object. The determination of the blur object may be described in detail, for example, in FIG. 3.

The image processing device 102 may be further configured to adjust a focal point (e.g., an autofocus (AF) point/Focus points) of the image capture device 106 to focus on the first object 110 that may be determined as the blur object. The adjustment of the focal point of the image capture device 106 may be done automatically and may not require a manual intervention from the user 112. The image processing device 102 may be further configured to control the image capture device 106 to capture a second image of the scene 108 based on the adjusted focal point of the image capture device. The second image may be captured with a focus on the first object 110 (i.e. the blur object). The image processing device 102 may be further configured to determine a second blur value of the first object 110 in the second image.

In accordance with an embodiment, the image processing device 102 may be configured to determine whether the determined second blur value is higher than the blur threshold value (BT) or higher than the first blur value of the first object 110 in the first image. The image processing device 102 may be further configured to replace the first object 110 (i.e. with first blur value) in the first image with the first object 110 (i.e. with second blur value) in the second image, based on the determination that the second blur value is higher than the blur threshold value (BT) or higher than the first blur value. The replacement of the first object 110 in the first image with the first object 110 in the second image has been described in detail, for example, in FIG. 4A.

In some embodiments, the image processing device 102 may be configured to adjust focal points of the image capture device 106 to focus on all blur objects identified in the first image. Thereafter, the image processing device 102 may be configured to capture a plurality of second images for each of all identified blur objects and replace each blur object in the first image with a corresponding object of the second image, in case the second blur value of the corresponding object is equal to or higher than the threshold blur value (BT).

The image processing device 102 may be further configured to generate an output image as the first image with all the identified objects well-focused and with high blur values. For example, a high blur value may be a high Laplacian blur value that may indicate an enhanced and acceptable level of sharpness (or focus) of all the identified objects in the first image. The image processing device 102 may be further configured to control the display screen 104 to display the output image. The output image may correspond to a well-focused image, where all the identified objects (or user-preferred objects or object types) appear as sharp, clear, and focused. All the objects in the displayed output image may have better focal levels as compared to the objects identified in the captured first image (as a preview image). The output image may correspond to a final high-quality image captured by the image capture device 106 based on the first user input (for example, with a single click) from the user 112. The output image generated by the image processing device 102 may not require application of post processing techniques on the capture first image to improve the image quality. Instead, the output image may be processed by the image processing device 102 between a first time at which a user input is received by the image capture device 106 to capture an image of the scene and a second time at which the output image is presented on the display screen 104. Thus, the disclosed image processing device 102 offers real-time correction of undesired or unwanted blur of regions (as preferred to be in focus by a user) in captured images and enhance a sharpness (or a focus) of the regions within a short duration of a capture event (e.g., user selects a capture option/button). The disclosed image processing device 102 further offers an automatic adjustment of one or more camera parameters (for example a focal point/autofocus (AF) points, depth of field, exposure/lens aperture area, plane of focus (POF)) of the image capture device 106 to generate the output image with all identified objects well-focused in the output image. The real-time correction offers a substantially faster solution to detect different objects as the object detection and identification is carried out based on pre-trained deep neural networks, such as a pre-trained convolutional neural network (CNN). Whereas, conventional post-processing techniques typically apply post-processing techniques to detect objects and apply correction on undesired blur in different regions of a captured image. In accordance with an embodiment, the disclosed image processing device 102 may further present different UI options onto the display screen 104 for the user 112 to select or deselect different identified objects for the blur correction in initially grabbed images (e.g., the first image or a preview image). The selection of the objects for the blur correction may be described in detail, for example, in FIG. 3.

Figure 2:
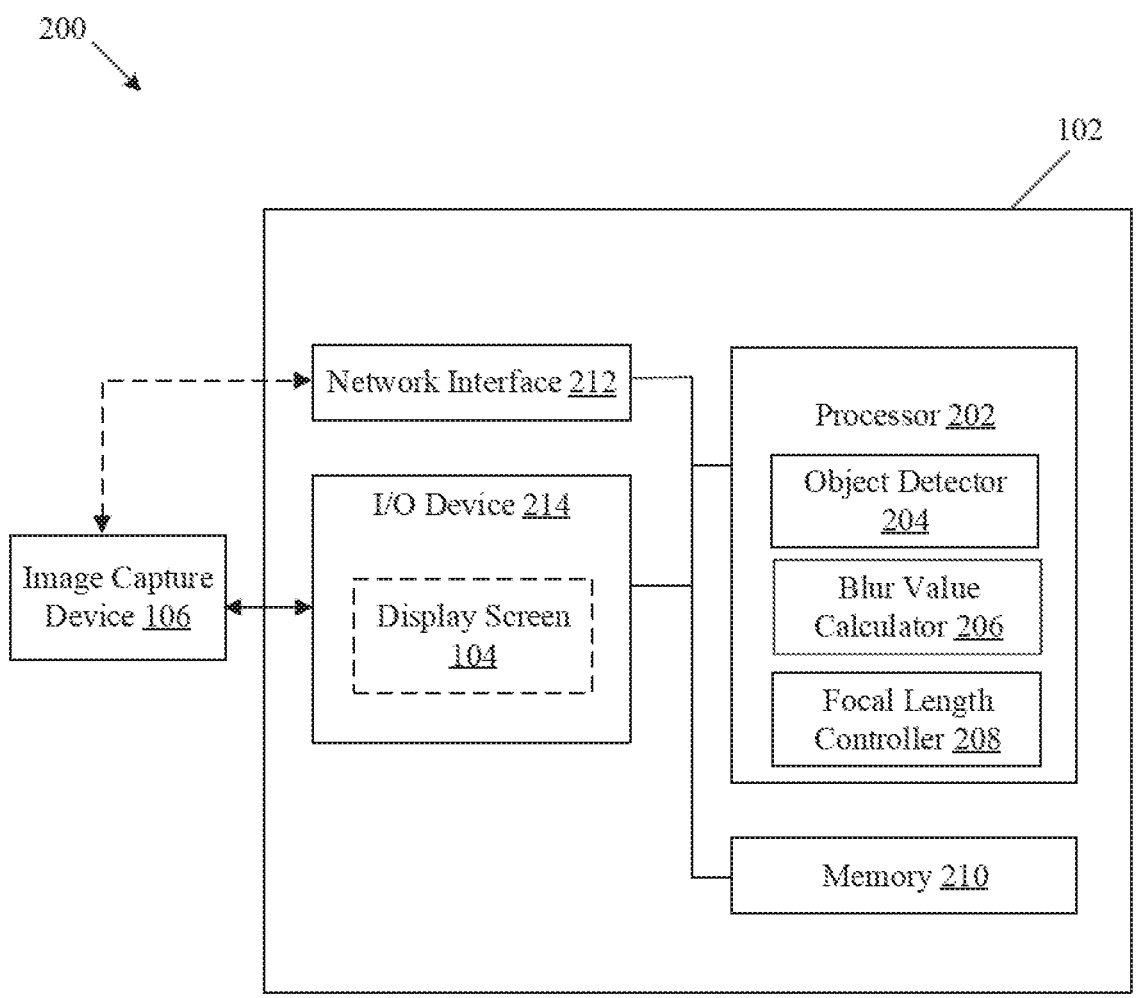
FIG. 2 is a block diagram that illustrates an exemplary image processing device to control an image capture device based on determination of a blur value of objects in images, in accordance with an embodiment of the disclosure.

FIG. 2 is a block diagram that illustrates an exemplary image processing device to control an image capture device based on determination of a blur value of objects in images, in accordance with an embodiment of the disclosure. FIG. 2 is described in conjunction with elements from FIG. 1. With reference to FIG. 2, there is shown the image processing device 102. The image processing device 102 may include a processor 202 that includes an object detector 204, a blur value calculator 206, and a focal length controller 208. The image processing device 102 further includes a memory 210, a network interface 212, and an input/output (I/O) device 214. The display screen 104 is part of the I/O device 214. With reference to FIG. 2, there is further shown the image capture device 106 of FIG. 1.

In accordance with an embodiment, the processor 202 may be communicatively coupled to the memory 210, the network interface 212, and the I/O device 214, via a communication bus. The network interface 212 may be configured to facilitate communication with external computing devices or servers (not shown), via a communication channel (not shown), under the control of the processor 202.

The processor 202 may comprise suitable logic, circuitry, and interfaces that may be configured to execute a set of instructions stored in the memory 210. The processor 202 may be configured to control the image capture device 106 to capture a first image based on the first user input. The processor 202 may be further configured to control the image capture device 106 to recapture the first image (as a second image) with an adjusted focus on blur objects. The processor 202 may be further configured to generate an output image based on replacement of the blur objects in the first image by cropped regions from the second image. The cropped regions may correspond to objects in the second image identified as the blur objects in the first image. The processor 202 may be configured to control the I/O devices 214 to receive different user inputs and control the display screen 104 to display the output image onto the display screen 104. The processor 202 may be implemented based on a number of processor technologies known in the art. Examples of the processor 202 may be an x86-based processor, a x86-64 based processor, a Reduced Instruction Set Computing (RISC) processor, an Application-Specific Integrated Circuit (ASIC) processor, a Complex Instruction Set Computing (CISC) processor, an Explicitly Parallel Instruction Computing (EPIC) processor, a Very Long Instruction Word (VLIW) processor, a graphic processor unit (GPU), and/or other processors or control circuits.

The object detector 204 may comprise suitable logic, circuitry, and interfaces that may be configured to detect and identify one or more objects (such as the first object 110) in the captured first image. The object detector 204 may be further configured to classify the detected objects into one or more object types. Example of the one or more object types may include, but are not limited to, human, animal, plants, vehicle, or building. The object detector 204 may be configured to identify the one or more objects in the first image by use of one or more object detection techniques. One of the object detection technique may be based on a DNN architecture, such as a CNN, a CNN-RNN, R-CNN, Fast R-CNN, Faster R-CNN, and YOLO network. In some embodiments, the object detector 204 may implement other object identification techniques, such as human shape-based object boundary identification, pre-specified shape-based or template based object identification, such as by use of Sobel operator or Prewitt operator. Examples of implementations of the object detector 204 may be a specialized circuitry, a GPU, a RISC processor, an ASIC processor, a CISC processor, a microcontroller, a central processing unit (CPU), or other control circuits.

In certain embodiments, the object detector 204 may be implemented based on a DNN learning model trained for detection and identification of objects in images. In such implementations, the object detector 204 may be a specialized DNN circuit and/or may implement a supplementary accelerator circuit, to boost training and/or speed of detection of objects in images captured by the image capture device 106. The accelerator circuitry may be an on-device (offline) accelerator circuitry (not shown in FIG. 1) or a server-end (online) accelerator circuitry (i.e., available on a cloud server). The learning rate and learning errors of the DNN learning model may be further optimized based on specific learning optimization models, for example, heuristic or meta-heuristic optimization models, or non-heuristic models, such as Adagrad, Adadelta, Adamax, momentum, AMSgrad, and the like.

The blur value calculator 206 may comprise suitable logic, circuitry, and interfaces that may be configured to determine blur values of the one or more objects identified by the object detector 204 from the captured first image. The blur value calculator 206 may be further configured to determine an average blur value (ABO) corresponding to the identified one or more objects. The blur values of the identified one or more objects may be determined based on one or more blur estimation techniques. Examples of the blur estimation techniques may include, but are not limited to, a Laplacian of Gaussian (LoG) filter or a Laplacian of pixel values, a Fast Fourier Transform (FFT)-based technique, a Sobel-Tenengrad operator (sum of high-contrast pixels), an edge-width based technique, a wavelet-based technique, a histogram-based technique, a power spectrum based technique, a variance-based technique, and a power spectrum-based technique. The blur value calculator 206 may be implemented as at least one of a specialized co-processor, a GPU, a RISC processor, an ASIC processor, a CISC processor, a microcontroller, a general purpose CPU, and/or other circuits.

The focal length controller 208 may comprise suitable logic, circuitry, and interfaces that may be configured to adjust the focal point of the image capture device 106 to focus on the blur objects (e.g. regions in the first image with the blur value lesser than the blur threshold value(BT)) that may be identified in the captured first image. Examples of implementations of the focal length controller 208 may be a specialized circuitry, a GPU, a RISC processor, an ASIC processor, a CISC processor, a microcontroller, a central processing unit (CPU), or other control circuits.

The memory 210 may comprise suitable logic, circuitry, and interfaces that may be configured to store a set of instructions executable by the processor 202, the object detector 204, and the blur value calculator 206. The memory 210 may be configured to store the first image and the second image of the scene 108 to be processed by the image processing device 102. The memory 210 may be configured to further store the determined blur values for the identified blur objects, the average blur value (ABO), and the blur threshold value (BT) to detect the identified objects as the blur objects. The memory 210 may be further configured to store positions or coordinates of the identified objects in the captured first image and the second image. The memory 210 may be configured to store one or more priority values assigned to the one or more object types for the identified objects. Examples of implementation of the memory 210 may include, but are not limited to, Random Access Memory (RAM), Dynamic Random Access Memory (DRAM), Electrically Erasable Programmable Read-Only Memory (EEPROM), Static Random Access Memory (SRAM), Read Only Memory (ROM), Hard Disk Drive (HDD), a Secure Digital (SD) card, flash drive, cache memory, and/or other non-volatile memory.

The network interface 212 may comprise suitable logic, circuitry, and interfaces that may be configured to communicate with the external computing devices or the servers, via a communication channel. The network interface 212 may be configured to establish communication between the image processing device 102 and the image capture device 106. The network interface 212 may be implemented by application of known technologies to support wired or wireless communication of the image processing device 102 with the communication channel. Components of the network interface 212 may include, but are not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The I/O device 214 may comprise suitable logic, circuitry, and interfaces that may be configured to receive the one or more user inputs from the user 112 and deliver one or more corresponding outputs to the user 112. Examples of an input device of the I/O device 214 may include, but are not limited to, a camcorder, a touch screen, a joystick, a microphone, a mode selector, one or more buttons (for example a shutter button). Examples of an output device of the I/O device 214 may include, but are not limited to, the display screen 104, a projector screen, and/or a speaker.

The functions or operations executed by the image processing device 102, as described in FIG. 1, may be performed by the processor 202, the object detector 204 and the blur value calculator 206. The operations executed by the processor 202, the object detector 204, and the blur value calculator 206 are further described in detail, for example, in FIGS. 3, 4A, and 4B.

Figure 3:
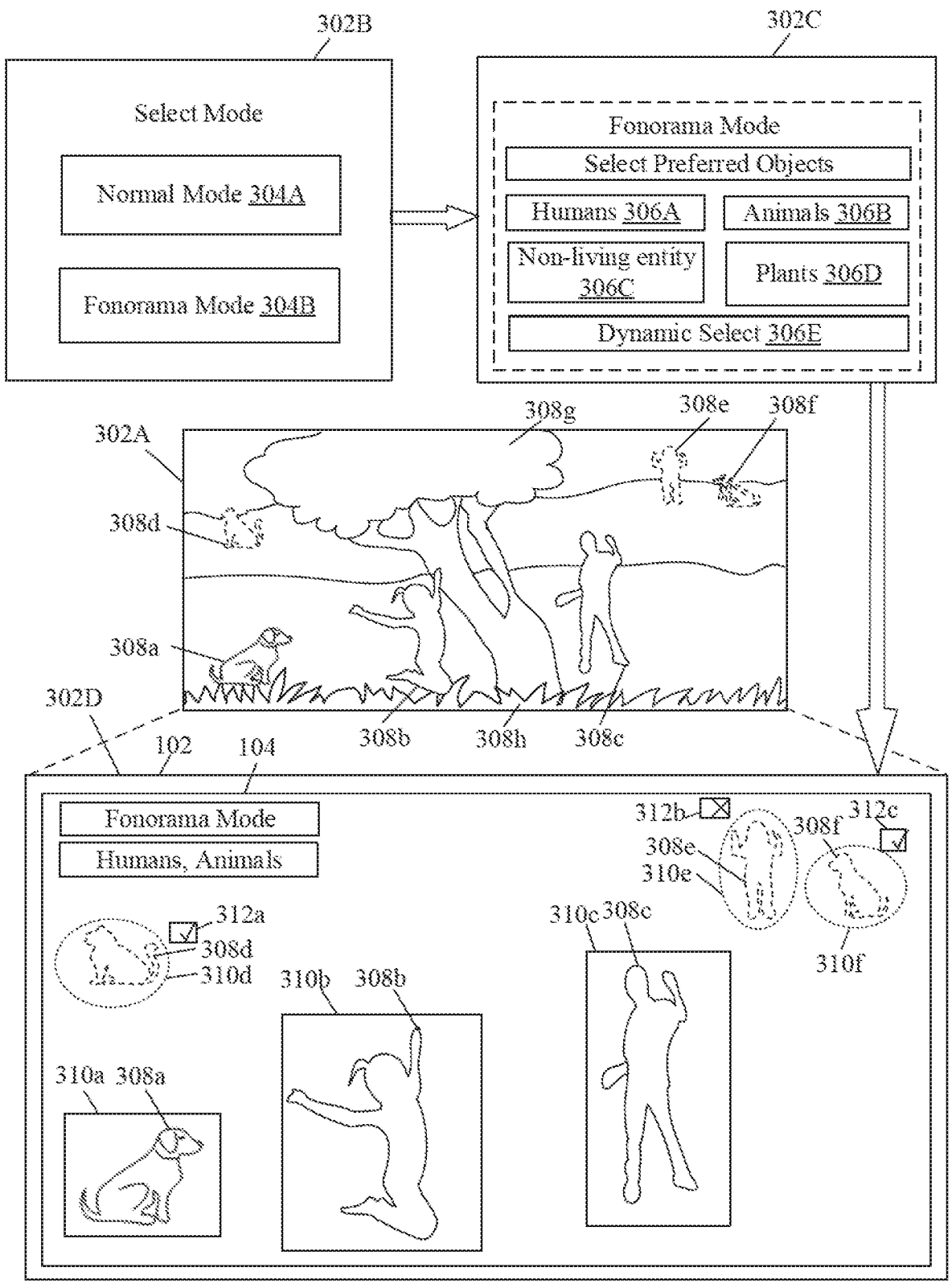
FIG. 3 illustrates exemplary operations for control of an image capture device by the image processing device of FIG. 2, based on determination of a blur value of objects in images, in accordance with an embodiment of the disclosure.

FIG. 3 illustrates exemplary operations for control of an image capture device by the image processing device of FIG. 2, based on determination of a blur value of objects in images, in accordance with an embodiment of the disclosure. FIG. 3 is described in conjunction with elements from FIGS. 1 and 2. With reference to FIG. 3, there is shown a first image 302A (as a base or an interim image) captured with the image capture device 106. The processor 202 may be configured to receive the first user input (via the I/O device 214) from the user 112 to capture the first image 302A for a first scene. For example, the first user input may a click (for example a capture button or a shutter button of the image capture device 106). The image processing device 102 may be configured to control the image capture device 106 to capture the first image 302A of the first scene based on the received first user input. In another example, the first user input may an initiation of an application interface to capture the first image 302A (as interim image) and display a preview of the captured first image 302A on the display screen 104 (i.e. as viewfinder). In accordance with an embodiment, the captured first image 302A may include a second plurality of objects 308a to 308h. With respect to FIG. 3, there is shown a preview image 302D corresponding to the captured first image 302A. The preview image 302D may the second plurality of objects 308a to 308h.

In FIG. 3, there is also shown a first user interface 302B for selection of different operational modes of the image processing device 102. The different operation modes may include, but are not limited to, a normal mode and a fonorama mode. The first user interface 302B may include a normal mode UI element 304A to select the normal mode and a fonorama mode UI element 304B to select the fonorama mode. The normal mode may correspond to one or more known image capture operations of the image processing device 102 (or the image capture device 106). Examples of the one or more known image capture operations may include, but are not limited to, a panoramic mode, a program mode, a macro mode, a night mode, an automatic mode, a manual mode, a landscape mode, or a portrait mode. The fonorama mode may correspond to an image capture operation with the disclosed blur correction of objects.

In operation, the processor 202 may be configured to receive a second user input (via the I/O device 214) to select a specific mode from the different operational modes of the image processing device 102. The specific mode may correspond to an image capture mode in which the blur value of an object in the captured image is corrected to generate an output image, as described in FIG. 1. In accordance with an embodiment, the specific mode may correspond to the fonorama mode to correct the blur value of the object to generate the output image. In accordance with an embodiment, the processor 202 may be configured to receive the second user input (through the fonorama mode UI element 304B in the first user interface 302B) to select the fonorama mode of the image processing device 102.

In accordance with an embodiment, the processor 202 may be configured to receive the second user input (via the I/O device 214) to select the fonorama mode and then receive the first user input to capture the first image 302A (as the interim image). In some embodiments, the processor 202 may be configured to directly receive the first user input from the user 112 in case the image processing device 102 is already set in the fonorama mode.

With reference to FIG. 3, there is further shown a second user interface 302C associated with the fonorama mode for selection of the one or more object types by the user 112. The second user interface 302C may include a plurality of UI elements 306A to 306E. The plurality of UI elements 306A to 306E may further include a first UI element 306A, a second UI element 306B, a third UI element 306C, a fourth UI element 306D, and a fifth UI element 306E. In accordance with an embodiment, the first UI element 306A, the second UI element 306B, the third UI element 306C, the fourth UI element 306D, and the fifth UI element may indicate one of, but is not limited to, a human object type, an animal object type, a plant object type, a non-living object type, and a dynamic object type, respectively.

In accordance with an embodiment, the object detector 204 may be configured to identify objects for the blur correction based on the one or more object types selected using the plurality of UI elements 306A to 306E in the second user interface 302C. In accordance with an embodiment, object detector 204 may be configured to identify the second plurality of objects 308a to 308h in the captured first image 302A based on the one or more object types. Example of the one or more object types may include, but are not limited to, humans, animals, plants, vehicles, or buildings. The one or more object types may be stored in the memory 210.

In accordance with an embodiment, the processor 202 may be configured to receive a third user input (via the I/O device 214) from the user 112 to select the one or more object types through the second user interface 302C. In some embodiments, the processor 202 may be configured to receive the third user input through the second user interface 302C before the receipt of the first user input to capture the first image 302A or display the preview image 302D. For example, the processor 202 may receive the third user input to select the first UI element 306A and the second UI element 306B to select the human object type and the animal object type, respectively, as the one or more preferred object types. The processor 202 may be further configured to store the selected human object type and the animal object type in the memory 210 for further processing (for example identification of objects in the captured image).

In accordance with an embodiment, in response to the receipt of the first user input, the object detector 204 may be configured to identify objects from the second plurality of objects 308A to 308h based on already stored one or more object types (for example human object type and the animal object type). With respect to FIG. 3, the object detector 204 may be configured to identify a plurality of human objects, 308b, 308c, and 308e and a plurality of animal objects 308a, 308d, and 308f from the second plurality of objects 308A to 308h based on the stored human object type and the animal object type. The object detector 204 may be further configured to exclude a plant object 308g and 308h from the identification based on the stored one or more object types (i.e. the human object type and the animal object type).

In accordance with an embodiment, the processor 202 may be configured to receive the third user input to select the fifth UI element 306E to select the dynamic object type. In case of the selection of the dynamic object type, the object detector 204 may be configured to identify all the second plurality of objects 308a to 308h included in the first image 302A. Thus, the selection of the one or more object types through the second user interface 302C may provide enough flexibility to the user 112 to select or deselect the preferred object types in real time. Such flexibility may further provide a fast identification of the second plurality of objects 308a to 308h for the blur correction based on the preferred object types stored in the image processing device 102.

In accordance with an embodiment, the processor 202 may be further configured to display the preview image 302D corresponding to the captured first image 302A on the display screen 104 as shown in FIG. 3. The preview image 302D may include the identified second plurality of objects 308a to 308f (for example human objects or animal objects) based on the stored one or more object types.

In accordance with an embodiment, the blur value calculator 206 may be configured to determine a blur value of each of the identified second plurality of objects 308a to 308f in the preview image 302D. The blur value calculator 206 may be configured to determine the blur value (i.e. amount of blur) of each of the identified second plurality of objects 308a to 308f based on a Laplacian operator. In accordance with an embodiment, the determined blur value may correspond to Laplacian value. The processor 202 may be further configured to determine a set of objects from the identified second plurality of objects 308a to 308f, as blur objects, based on the determined blur value. The processor 202 may be further configured to compare the determined blur value of each of the identified second plurality of objects 308a to 308f with the blur threshold value BT to determine the set of objects as the blur objects.

For example, with respect to FIG. 3, each of a first object 308a, a second object 308b, and a third object 308c from the identified second plurality of objects 308a to 308f may have a higher blur value than the blur threshold value (BT). The processor 202 may identify the first object 308a, the second object 308b, and the third object 308c as sharp (or clear) objects with corresponding blur value higher than the blur threshold value. Further, a fourth object 308d, a fifth object 308e, and a sixth object 308f from the second plurality of objects 308a to 308h may have a blur value lower than the blur threshold value (BT). The processor 202 may identify the fourth object 308d, the fifth object 308e, and the sixth object 308f as the blur objects, with corresponding blur values lower than the blur threshold value.

In accordance with an embodiment, the processor 202 may be configured to determine an average blur value (ABO) based on the determined blur value of each of the identified second plurality of objects 308a to 308f in the preview image 302D. The processor 202 may be configured to compare the determined blur value of each of the identified second plurality of objects 308a to 308f with the determined average blur value (ABO) to determine the set of objects as the blur objects (or the sharp objects).

With respect to FIG. 3, there is also shown a plurality of identifiers 310a to 310f corresponding to the identified second plurality of objects 308a to 308f in the preview image 302D. The processor 202 may be configured to control the display screen 104 to display the plurality of identifiers 310a to 310f corresponding to the second plurality of objects 308a to 308f in the preview image 302D. The plurality of identifiers 310a to 310f may indicate a level of blur (or the determined blur value) of each of the second plurality of objects 308a to 308f. For example, a first identifier 310a, a second identifier 310b, and a third identifier 310c may be represented with a rectangle in the preview image 302D corresponding to the first object 308a, the second object 308b, and the third object 308c (considered as the sharp objects), respectively. Further, a fourth identifier 310d, a fifth identifier 310e, and a sixth identifier 310f may be represented with a dotted oval in the preview image 302D corresponding to the fourth object 308d, the fifth object 308e, and the sixth object 308f (as the blur objects), respectively. A person with ordinary skill in the art will understand that the scope of the plurality of identifiers 310a to 310f may not be limited to a rectangle or an oval shape. Instead, the processor 202 may be configured to represent the plurality of identifiers 310a to 310f with different graphical identifiers that may be known to one skilled in the art. Examples of different graphical identifiers to uniquely distinguish the sharp objects and the blur objects may include, but are not limited, a color of an object, a brightness of an object, a text associated with an object, or other information associated with an object.

In accordance with an embodiment, the processor 202 may be further configured to control the display screen 104 to display a plurality of second UI elements 312a, 312b, and 312c (for example, checkboxes) corresponding to the fourth object 308d, the fifth object 308e, and the sixth object 308f (as the blur objects), respectively, in the preview image 302D. The processor 202 may be configured to receive a fourth user input through the plurality of second UI elements 312a, 312b, and 312c from the user 112. The processor 202 may be configured to select or remove one or more identified blur objects (i.e. for blur correction) from the fourth object 308d, the fifth object 308e, and the sixth object 308f (as the blur objects) based on the received fourth user input.

For example, as shown in FIG. 3, the processor 202 may receive the fourth user input, through a first object UI element 312a and a third object UI element 312c, to select the fourth object 308d and the sixth object 308f respectively for the blur correction. In another example, the user 112 may not be interested to select the fifth object 308e for the blur correction as the fifth object 308e may be a distant object in the preview image 302D. In such case, the processor 202 may be configured to receive the fourth user input, through a second object UI element 312b to deselect (or remove from a list of objects for the blur correction) the fifth object 308e. In accordance with an embodiment, the processor 202 may be configured to select all the blur objects based on the stored one or more object types predefined by the user 112. In such case, the processor 202 may select the fifth object 308e as being identified with the human object type. In some embodiments, the processor 202 may be configured to receive the fourth user input to select one or more of the second plurality of identified objects 308a to 308f for the blur correction. In some embodiments, the processor 202 may be configured to select all the determined blur objects (i.e. the fourth object 308d, the fifth object 308e, and the sixth object 308f) for the correction of blur without display of the plurality of second UI elements 312a to 312f in the preview image 302D. For example, in case the user 112 forgets to select or deselect the objects in the preview image 302D, then the processor 202 may be configured to determine (say using machine learning) that the fonorama mode has already been selected by the user 112 or stored as a current mode of operation in the memory 210. Based on the determination, the processor 202 may be further configured to select all the determined blur objects (i.e. the fourth object 308d, the fifth object 308e, and the sixth object 308f) for the blur correction without being dependent on the user 112 to select or deselect the objects in the preview image 302D.

With respect to FIG. 3, there is shown that the fifth object 308e (i.e. blur object) is deselected (or removed from the list of objects) for the blur correction, and the fourth object 308*d* (i.e. a blur object) and the sixth object 308*f* (i.e. a blur object) are selected for the blur correction. In accordance with an embodiment, the processor 202 may be configured to control the display screen 104 to display the determined average blur value (ABO) and the determined blur value of each of the identified second plurality of objects 308*a* to 308*f* in the preview image 302D. The processor 202 may be configured to select all the objects with the determined blur value lesser than the average blur value (ABO) for the blur correction. For example, the second object 308*b* and the third object 308*c* (as the sharp objects) may be selected for the blur correction, as the determined blur value of the second object 308*b* and the third object 308*c* is less than the determined average blur value (ABO).

In accordance with an embodiment, the fifth object 308*e* (i.e. a blur object) which is deselected for the blur correction may be termed as a third object. A plurality of blur objects (i.e. the fourth object 308*d* and the sixth object 308*f*) other than the removed third object (i.e. the fifth object 308*e*) may correspond to a first plurality of objects 308*d* and 308*f* (considered by the processor 202 for the blur correction). In some embodiments, the second plurality of identified objects 308*a* to 308*f* other than the removed third object (i.e. the fifth object 308*e*) may correspond to a first plurality of objects 308*b*, 308*c*, 308*d*, and 308*f* (considered by the processor 202 for the blur correction). In accordance with an embodiment, the processor 202 may be configured to correct the blur value for each of the first plurality of objects 308*d* and 308*f* selected by the user 112.

In accordance with an embodiment, the processor 202 may be configured to sort the first plurality of objects 308*d* and 308*f* in an order of priority before the blur correction is applied on the first plurality of objects 308*d* and 308*f*. The order of priority may correspond to a logical sequence in which individual blur objects (or blur regions) may be selected from the first plurality of objects 308*d* and 308*f*, sequentially, for the blur correction.

The processor 202 may be configured to sort the first plurality of objects 308*d* and 308*f* based on the determined blur value of each of the first plurality of objects 308*d* and 308*f*. For example, the determined blur value of the sixth object 308*f* (i.e. blur object) may be lowest among the first plurality of objects 308*d* and 308*f*. The lowest blur value may indicate that the sixth object 308*f* may be most blurry object among the first plurality of objects 308*d* and 308*f* in the preview image 302D. Therefore, the sixth object 308*f* may be a first ordered object considered for the blur correction. With respect to FIG. 3, the fourth object 308*d* may be a second ordered object considered for the blur correction. The processor 202 may be configured to sort the first plurality of objects 308*d* and 308*f* in the order (i.e. the sixth object 308*f*, the fourth object 308*d*) based on the determined blur value. The order of priority may be stored in the memory 210 and reuse every time the user may operate the image capture device 106 to capture images of similar object types.

In accordance with an embodiment, the processor 202 may be configured to sort the first plurality of objects 308*d* and 308*f* based on the one or more object types (selected by the user 112 through the second user interface 302C). The one or more object types used to sort the first plurality of objects 308*d* and 308*f* may be predefined. For example, objects (in the first plurality of objects 308*d* and 308*f*) with the human object type may be given a highest priority. For example, if the fifth object 308*e* was selected for the blur correction in the preview image 302D, then the fifth object 308*e* (as a human object) may be assigned with a higher priority than the fourth object 308*d* and the sixth object 308*f* (as animals).

In accordance with an embodiment, the processor 202 may be configured to sort the first plurality of objects 308*d* and 308*f* based on the determined blur value and the one or more object types associated with each of the first plurality of objects 308*d* and 308*f* for the blur correction. The processor 202 may be configured to sort the first plurality of objects 308*d* and 308*f* based on the stored priority values assigned to the one or more object types.

In accordance with an embodiment, the processor 202 may be further configured to generate a list of sorted objects (for example the sixth object 308*f* the fourth object 308*d*) for the blur correction of the first plurality of objects 308*d* and 308*f*. The processor 202 may be configured to determine positions of each of the sorted objects (i.e. the sixth object 308*f*, the fourth object 308*d*) in the generated listed. The determined positions may indicate pixel coordinates of the sorted objects in the first image 302A or the preview image 302D. The determined positions of each of the sorted objects may indicate the pixel coordinates of boundary of each of the sorted objects in the first image 302A or the preview image 302D. Alternatively, the determined positions of each of the sorted objects may indicate the pixel coordinates of a region (shown as 404A and 408B in FIGS. 4A and 4B), which may enclose the corresponding sorted objects. The processor 202 may be further configured to store the generated list in the memory 210 and the determined positions of each of the sorted objects in the generated list. The generated list may include an object identifier and the determined positions of each of the sorted objects (i.e. the fourth object 308*d*, and the sixth object 308*f*).

Figure 4A:
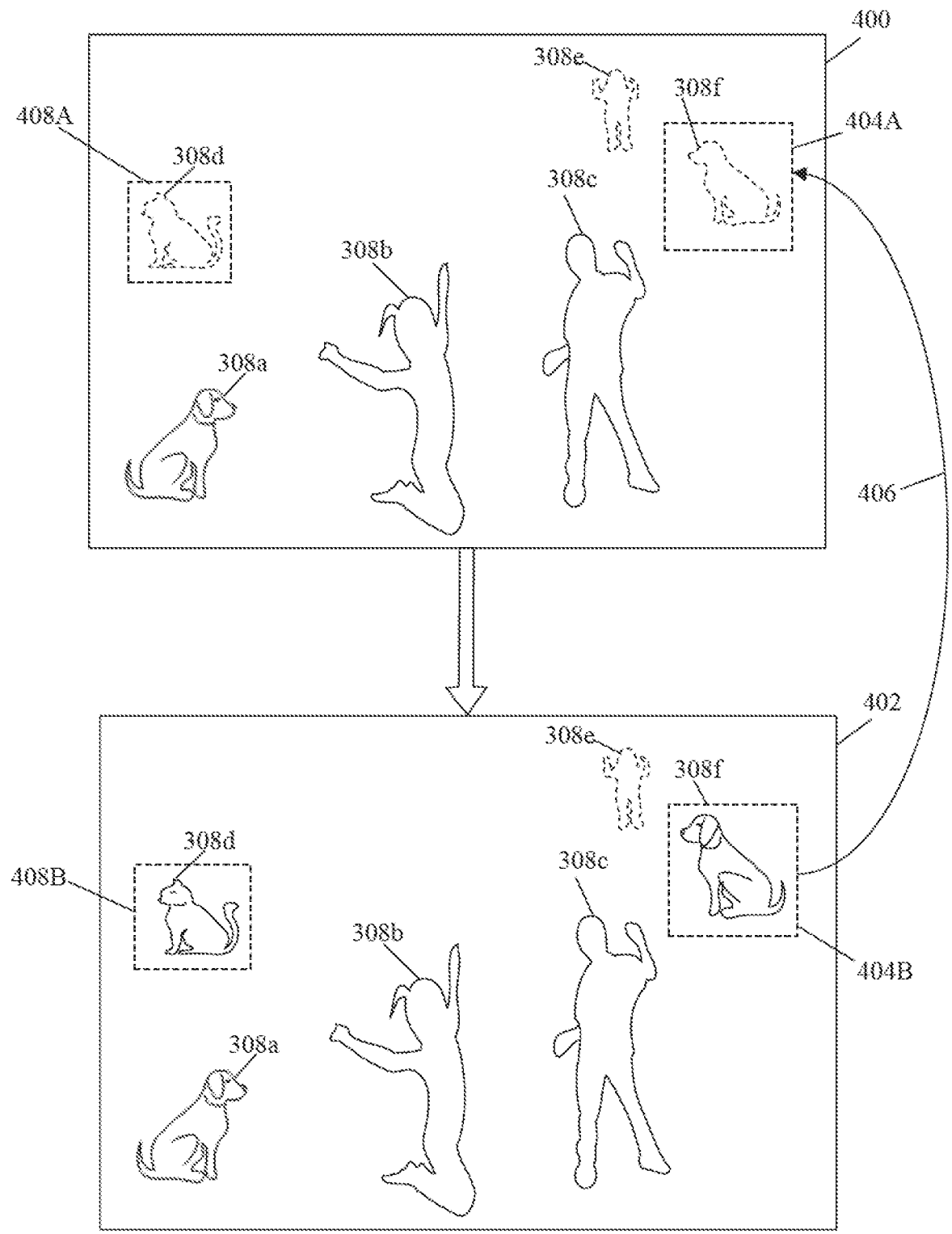
FIGS. 4A and 4B, collectively, illustrate an exemplary scenario for generation of a well-focused image by the image processing device of FIG. 2, based on determination of a blur value of objects in images, in accordance with an embodiment of the disclosure.
Figure 4B:
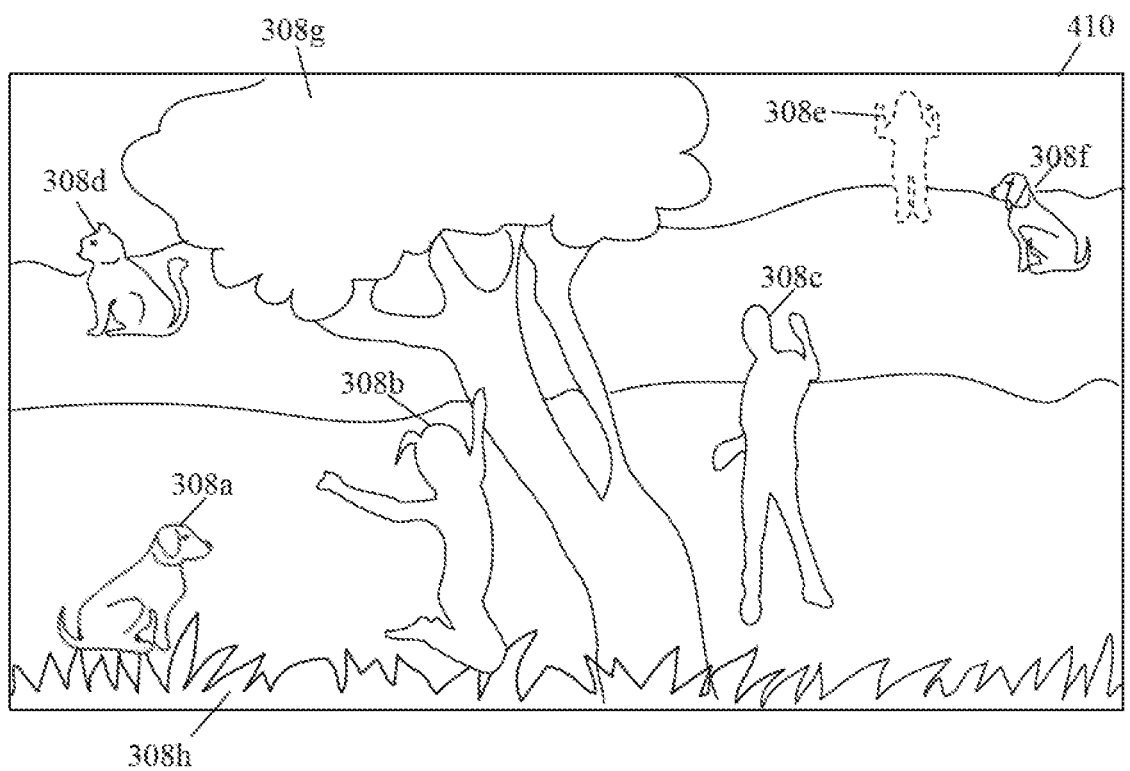

FIGS. 4A and 4B, collectively, illustrate an exemplary scenario for generation of a well-focused image by the image processing device of FIG. 2, based on determination of a blur value of objects in images, in accordance with an embodiment of the disclosure. FIGS. 4A and 4B are explained in conjunction with FIGS. 1, 2, and 3. With reference to FIG. 4A, there is shown a first image 400. The first image 400 may correspond to the first image 302A of the first scene, as shown in FIG. 3. The first image 400 may include the second plurality of identified objects 308*a* to 308*f*. In some embodiments, the first image 400 may further include the first plurality of objects 308*d*, and 308*f* determined for the blur correction, as described in FIG. 3. In some embodiments, the first image 400 may be an image already stored in the memory 208 on which the blur correction has not been performed at the time of image capture or preview.

With respect to FIG. 4A, there is also shown a first region 404A around the sixth object 308*f* (for example, a first blur object in a sorted list) and a third region 408A around the fourth object 308*d* (for example, a second blur object in the sorted list). The processor 202 may be configured to correct the blur value for each of the sorted objects in the generated list. For example, the processor 202 may be configured to retrieve an object identifier and a position of the sixth object 308*f* (i.e. the first blur object) in the first image 400. The focal length controller 208 may be configured to adjust the focal point of the image capture device 106 to focus on the sixth object 308*f* in the first image 400. Alternatively, the processor 202 may be configured to adjust the focal point of the image capture device 106 to focus on the retrieve positioned of the sixth object 308*f*. Alternatively, the focal length controller 208 may be further configured to adjust the focal point of the image capture device 106 to focus on the first region 404A around the sixth object 308*f*.

With respect to FIG. 4A, there is also shown a second image 402. In accordance with an embodiment, the second image 402 (as shown in FIG. 4A) may include the second plurality of identified objects 308a to 308f similar to the first image 400. In accordance with an embodiment, the processor 202 may be further configured capture the second image 402 based on the adjusted the focal point (i.e. with focus on the sixth object 308f). With respect to FIG. 4A, the sixth object 308f in the second image 402 may be represented as the sharp object. For the identification of the sixth object 308f in the second image 402 as the sharp object, the blur value calculator 206 may be configured to determine the second blur value of the sixth object 308f in the captured second image 402. The processor 202 may be further configured to compare the determined second blur value with at least one of the blur threshold value (BT) or the average blur value (ABO) corresponding to the second plurality of identified objects 308a to 308f. The processor 202 may be further configured to determine the sixth object 308f, as the sharp object, based on a determination that the determined second blur value of the sixth object 308f in the captured second image 402 is higher than at least one of the blur threshold value (BT) or the average blur value (ABO).

In accordance with an embodiment, the processor 202 may be further configured to identify the sixth object 308f as the sharp object, based on a determination that the determined second blur value of the sixth object 308f in the captured second image 402 is higher than both the blur threshold value (BT) and the average blur value (ABO). Alternatively, the processor 202 may be further configured to determine the sixth object 308f as the sharp object, based on a determination that the determined second blur value of the sixth object 308f in the captured second image 402 is higher than the determined first blur value of the sixth object 308f in the captured first image 400. In accordance with an embodiment, the focal length controller 208 may be configured to adjust the focal point of the image capture device 106 to focus on the sixth object 308f and capture the second image 402 multiple times until a sharpness of the sixth object 308f in the captured second image 402 is better than that in the captured first image 400.

The processor 202 may be configured to crop the sixth object 308f from a second region 404B in the captured second image 402, based on the determination that the sixth object 308f in the captured second image 402 represents the sharp object (or with higher blur value). The sixth object 308f may be cropped based on known image cropping techniques that rely on a nonrectangular mat or a picture frame to mark an area of image that may be retained in the captured second image 402 while remaining region may be discarded. The second region 404B around the sixth object 308f in the captured second image 402 may represent same pixel coordinates as the first region 404A around the sixth object 308f in the captured first image 400. The processor 202 may be further configured to replace the first region 404A in the first image 400 with the cropped second region 404B of the sixth object 308f in the captured second image 402.

In accordance with an embodiment, the processor 202 may be configured to stitch the cropped second region 404B at the retrieve positions in the first image 400 to replace the first region 404A in the first image 400 with the cropped second region 404B. The cropped second region 404B may be stitched at retrieved positions by application of an image stitching technique that may be known to one skilled in the art. Examples of such an image stitching technique may include, but is not limited to, an intensity or a slope field-based stitching technique, an image features-based technique that relies on image removal and blending technique(s), a Gradient-domain seamless stitching (GIST1 and GIST2) technique, and a seamless stitching technique based on wavelet transforms. The replacement of the first region 404A with the cropped second region 404B may be represented with an arrow 406 in FIG. 4A. With the replacement of the sixth object 308f (as the blur object) in the first image 400 with the sixth object 308f (as the sharp object) in the second image 402, the disclosed image processing device 102 may provide the blur correction for the sixth object 308f (as the first blur object) in the first image 400.

In accordance with an embodiment, the processor 202 may be further configured to retrieve the object identifier and the corresponding positions of the fourth object 308d (as the second blur object in the sorted list) in the first image 400. The focal length controller 208 may be further configured to adjust the focal point of the image capture device 106 to focus on the retrieve positioned of the fourth object 308d and capture another second image based on the adjusted focal point (i.e. a focus on the fourth object 308d). The processor 202 may be further configured to replace the third region 408A of the fourth object 308d in the first image 400 with a fourth region 408B of the fourth object 308d in the other second image based on the determination that the fourth object 308d in the other second image represents a sharp object (or with higher blur value). Thus, with the replacement of the fourth object 308d (as the second blur object) in the first image 400 with the fourth object 308d (as the sharp object) in the other second image, the disclosed image processing device 102 may provide the blur correction for the fourth object 308d (as the second blur object) in the first image 400.

Similarly, the processor 202 may be further configured to perform the blur correction for each of the sorted objects to generate the output image 410, as shown in FIG. 4B. The processor 202 may be configured to control the display screen 104 to display the generated output image 410. The output image 410 may be a well-focused image, where all the sorted objects (i.e. the sixth object 308f and the fourth object 308d in the list) appear as the sharp objects. The output image 410 may include the first object 308a, the second object 308b and the third object 308c which were initially identified as the sharp objects. With respect to FIG. 4B, the output image 410 may represent the fifth object 308e as a blur object considering the fifth object 308e was removed by the user 112 for the blur correction in the preview image 302D (as described as example in FIG. 3).

The output image 410 may be the final image captured based on the received first user input, i.e., with a single click/touch of button(s) on the image capture device 106. The processor 202 may be configured to discard all second images as temporary images (i.e. intermediate images only used to generate the final output image) captured for each of the sorted objects in the list for the blur correction. Thus, the disclosed image processing device 102 generates a well-focused and high-quality output image, where all the identified objects appear as sharp objects, which may further enhance a photography experience of the user 112. In some embodiments, the processor 202 may be configured to store all the second images (i.e. captured with adjusted focus on each blur object) in the memory 210 for future blur correction during post-processing of stored image.

In accordance with an embodiment, the processor 202 may be configured to perform the blur correction on an image stored in the memory 210. The image may be stored without the blur correction being performed at the time of capture of the image. In such case, the image (i.e. as base image) may be stored along with one or more second images (i.e. which were captured with adjusted focus on each blur object identified in the image at the time of capture). The processor 202 may be configured to receive the first user input from the user 112 to select the image stored in the memory 210. For example, the image processing device 102 may be set in the fonorama mode to perform the blur correction on the stored image. In response to the selection of stored image (i.e. the base image), the processor 202 may be configured correct the blur value of each blur object in the image using the stored one or more second images as described in with respect to FIG. 4A. In some embodiments, the processor 202 may be configured to correct the blur value of each identified blur object in the image using known image processing techniques used to improve the blur of the stored image during post-processing.

Figure 5A:
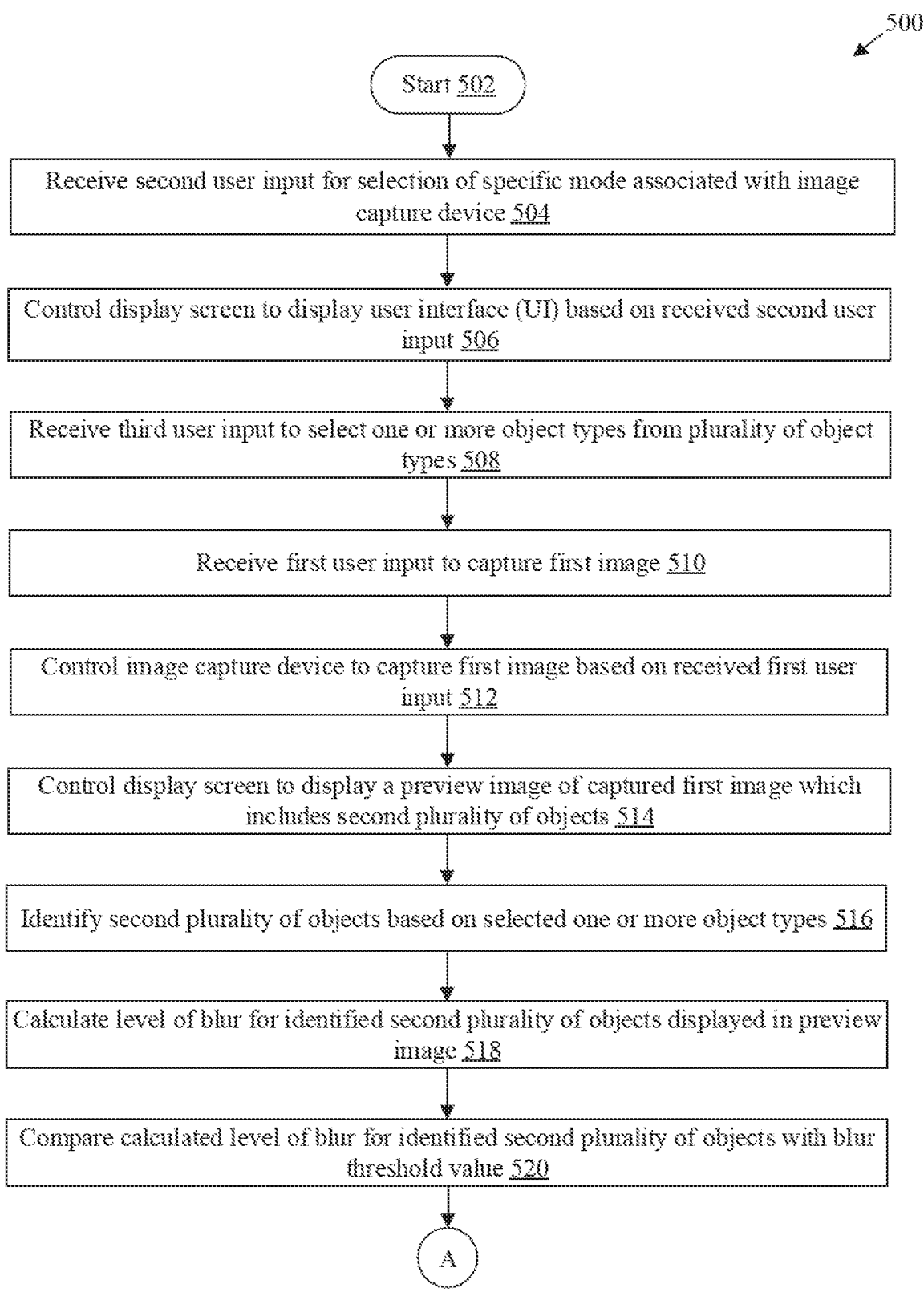
FIGS. 5A to 5C, collectively, depict a flowchart that illustrates exemplary operations for an image capture device control based on determination of a blur value of objects in images, in accordance with an embodiment of the disclosure.
Figure 5B:
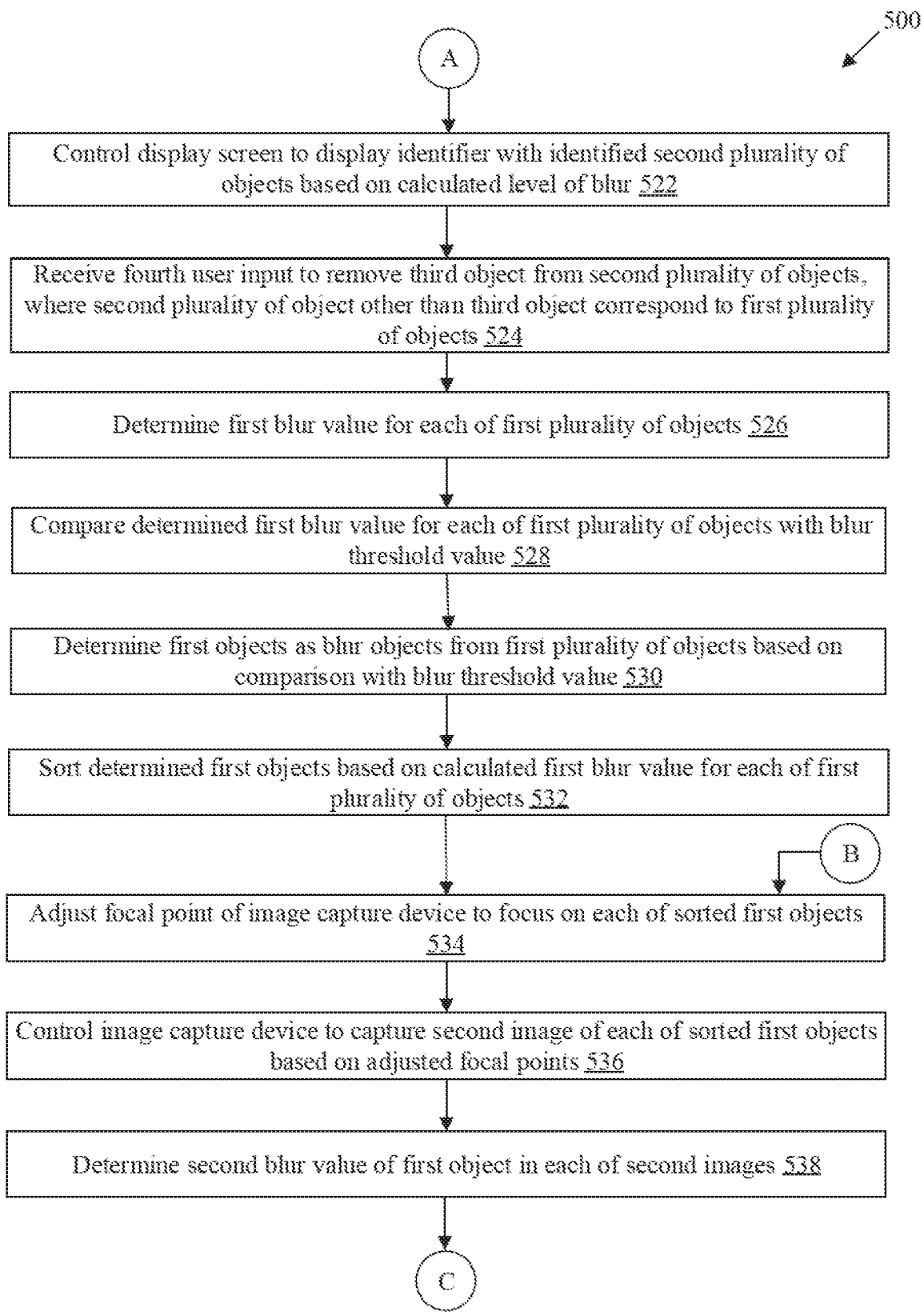
Figure 5C:
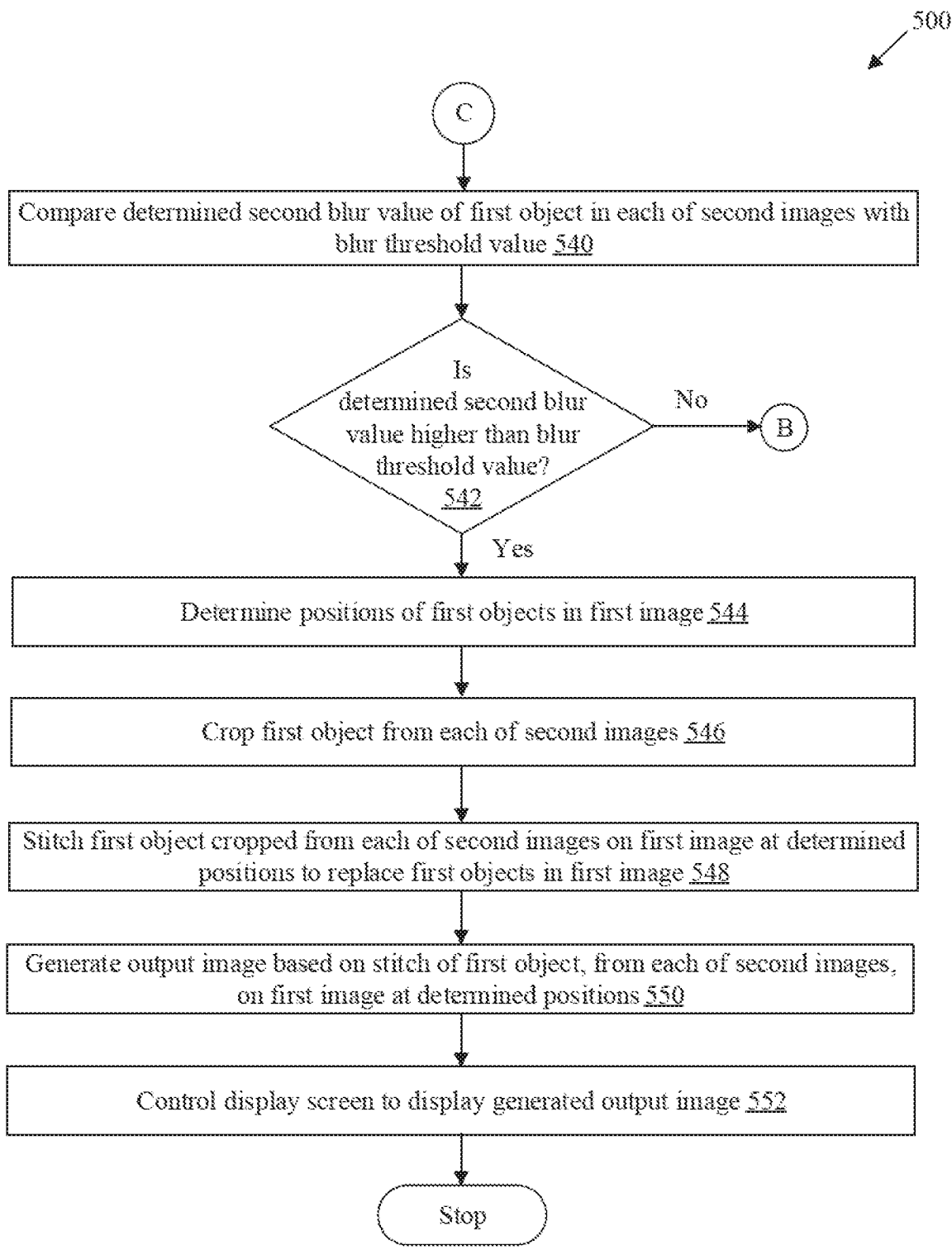

FIGS. 5A to 5C, collectively, depict a flowchart that illustrates exemplary operations for an image capture device control based on determination of a blur value of objects in images, in accordance with an embodiment of the disclosure. With reference to FIGS. 5A to 5C, there is shown a flow chart 500. The flow chart 500 is described in conjunction with FIGS. 1, 2, 3, 4A, and 4B. The operations from 502 to 552 may be implemented in the image processing device 102. The operation may start at 502 and proceed to 504.

At 504, a second user input may be received for a selection of a specific mode associated with the image capture device 106. In accordance with an embodiment, the processor 202 may be configured to receive the second user input for the selection of the specific mode associated with the image capture device 106. As an example, the specific mode may correspond to a fonorama mode described in FIG. 3.

At 506, the display screen 104 may be controlled to display a user interface (UI) based on the received second user input. The UI may depict a plurality of object types. In accordance with an embodiment, the processor 202 may be configured to control the display screen 104 to display the user interface (UI) based on the received second user input. As an example, the user interface (UI) may be represented by the second user interface 302C of FIG. 3.

At 508, a third user input to select one or more object types from the plurality of object types may be received. In accordance with an embodiment, the processor 202 may be configured to receive the third user input through the second user interface 302C, for selection of one or more object types from the plurality of object types.

At 510, a first user input to capture the first image may be received. In accordance with an embodiment, the processor 202 may be configured to receive the first user input from the user 112 to capture the first image of a scene.

At 512, image capture device 106 may be controlled to capture the first image based on the received first user input. The captured first image may include a second plurality of objects. In accordance with an embodiment, the processor 202 may be configured to control the image capture device 106 to capture the first image based on the received first user input.

At 514, the display screen 104 may be controlled to display a preview image of the captured first image, which may include the second plurality of objects. In accordance with an embodiment, the processor 202 may be configured to control the display screen 104 to display the preview image corresponding to the captured first image, which may include the second plurality of objects. The preview image (e.g. preview image 302D) is described in detail, for example, in FIG. 3.

At 516, the second plurality of objects may be identified based on the selected one or more object types. In accordance with an embodiment, the object detector 204 may be configured to identify the second plurality of objects based on the selected one or more object types.

At 518, a level of blur may be calculated for the identified second plurality of objects displayed in the preview image. In accordance with an embodiment, the blur value calculator 206 may be further configured to calculate the level of blur of the identified second plurality of objects displayed in the preview image. The level of blur of the identified second plurality of objects is described in detail, for example, in FIG. 3.

At 520, the calculated level of blur for the identified second plurality of objects may be compared with a blur threshold value. In accordance with an embodiment, the processor 202 may be configured to compare the calculated level of blur for the identified second plurality of objects with the blur threshold value.

At 522, the display screen 104 may be controlled to display an identifier with the identified second plurality of objects based on the calculated level of blur. In accordance with an embodiment, the processor 202 may be configured to control the display screen 104 to display the identifier (such as 310a to 310f in FIG. 3) with each of the identified of second plurality of objects based on the calculated level of blur. The identifier displayed on the display screen 104 is described in detail, for example, in FIG. 3.

At 524, a fourth user input may be received for removal of a third object from the second plurality of objects. In accordance with an embodiment, the processor 202 may be configured to receive the fourth user input (through the plurality second UI elements 312a to 312c in FIG. 3), for removal of the third object from the second plurality of objects. The first plurality of objects may be obtained from the second plurality of objects after a third object is removed from the second plurality of objects.

At 526, a first blur value may be determined for each of the first plurality of objects. In accordance with an embodiment, the blur value calculator 206 may be configured to determine the first blur value for each of the first plurality of objects.

At 528, the determined first blur value for each of the first plurality of objects may be compared with a blur threshold value (BT). In accordance with an embodiment, the processor 202 may be configured to compare the determined first blur value for each of the first plurality of objects with the blur threshold value.

At 530, first objects may be determined as blur objects from the first plurality of objects, based on a comparison with the blur threshold value (BT). In accordance with an embodiment, the processor 202 may be configured to determine the first objects as the blur objects from the first plurality of objects, based on a comparison with the blur threshold value.

At 532, the determined first objects may be sorted based on the calculated first blur value for each of the first plurality of objects. In accordance with an embodiment, the processor 202 may be configured to sort the determined first objects based on the calculated first blur value for each of the first plurality of objects. In some embodiments, the processor 202 may be configured to sort the determined first objects based on the one or more object types (selected by the user 112 through the second user interface 302C). In other embodiments, the processor 202 may be configured to sort the determined first objects based on priority of one or more object types predefined by the user 112.

At 534, a focal point of the image capture device 106 may be adjusted to focus on each of the sorted first objects. The processor 202 may be configured to adjust the focal point of the image capture device 106 to focus on each of the sorted first objects (determined as the blur objects).

At 536, the image capture device 106 may be controlled to capture a second image of each of the sorted first objects based on the adjusted focal points. In accordance with an embodiment, the processor 202 may be configured to control the image capture device 106 to capture the second image of each of the sorted first objects based on the adjusted focal points.

At 538, the second blur value of the first object in each of the second images may be determined. In accordance with an embodiment, the blur value calculator 206 may be configured to determine the second blur value of the first object in each of the second images.

At 540, the determined second blur value of the first object in each of the second images may be compared with the blur threshold value. In accordance with an embodiment, the processor 202 may be configured to compare the determined second blur value of the first object in each of the second images with at least one of the blur threshold value (BT) or the average blur value (ABO) corresponding to the first plurality of objects.

At 542, it may be determined whether the determined second blur value is higher than the blur threshold value (BT). In accordance with an embodiment, the processor 202 may be configured to determine whether the determined second blur value is higher than the blur threshold value (BT). In cases where the determined second blur value is higher than the blur threshold value, control passes to 544. Otherwise, control passes to 534.

At 544, positions of first objects may be determined in the first image. In accordance with an embodiment, the processor 202 may be configured to determine the positions of first objects (as the blur objects) in the first image as described in FIG. 4A.

At 546, the first object may be cropped from each of the second images. In accordance with an embodiment, the processor 202 may be configured to crop the first object from each of the second images.

At 548, the first object cropped from each of the second images may be stitched at the determined positions on the first image to replace the first object in the first image. In accordance with an embodiment, the processor 202 may be configured to stitch the cropped first object on the first image at the determined positions to replace the first objects in the first image.

At 550, an output image may be generated based on the stich of the first object, from each of the second images, on the first image at the determined positions. In accordance with an embodiment, the processor 202 may be configured to generate the output image based on the stich of the first object, from each of the second images, on the first image at the determined positions. The output image is described in detail, for example, in FIG. 4B.

At 552, the display screen 104 may be controlled to display the generated output image. In accordance with an embodiment, the processor 202 may be configured to control the display screen 104 to display the generated output image. The output image may have well-focused first objects. Control passes to end.

Exemplary aspects of the disclosure may include an image processing device (such as the image processing device 102) that includes a display screen (such as the display screen 104) configured to control an image capture device (such as the image capture device 106) to capture image, such as the first image based on a user input (such as the first user input). The image processing device 102 may further include a processor (such as the processor 202) configured to control the image capture device 106 to capture the first image. The first image may be captured based on the first user input. The object detector 204 may be configured to identify a first object from a first plurality of objects in the first image. The blur value calculator 206 may be configured to determine a first blur value of the identified first object. The processor 202 may be further configured to determine the identified first object as a blur object based on the determined first blur value. The processor 202 may be configured to adjust a focal point of the image capture device 106 to focus on the first object determined as the blur object. The processor 202 may be configured to control the image capture device 106 to capture a second image of the first object based on the adjusted focal point. The processor 202 may be configured to replace the first object in the first image with the first object in the second image to generate an output image. The processor 202 may be configured to control a display screen to display the output image.

The processor 202 may be further configured to receive a second user input for selection of a specific mode associated with the image capture device. The processor 202 may be configured to control the display screen to display a user interface (UI) based on the selection of the specific mode. The UI may comprise a first UI element configured to receive a third user input for selection of one or more object types of a second plurality of objects to be included in a preview image corresponding to the first image. The processor 202 may be configured to control the display screen to display the preview image corresponding to the first image. The preview image may comprise the second plurality of objects selected based on the third user input for the selection of the one or more object types.

The processor 202 may be further configured to control the display screen to display an identifier corresponding to each second object of the second plurality of objects displayed in the preview image. The identifier may indicate a level of blur of each second object of the second plurality of objects. The processor 202 may be configured to control the display screen to display a second UI element corresponding to one or more of the second plurality of objects displayed in the preview image. The second UI element may be configured to receive a fourth user input for removal of a third object from the one or more of the second plurality of objects displayed in the preview image. The removal of the third object may be based on the level of blur indicated by the identifier. The first plurality of objects may correspond to the second plurality of objects other than the removed third object.

The processor 202 may be further configured to compare the determined first blur value of the identified first object with a blur threshold. The blur value calculator 206 may be configured to determine the identified first object as the blur object based on the comparison. The blur value calculator 206 may be further configured to determine an average blur value corresponding to the first plurality of objects. The blur value calculator 206 may be configured to compare the determined first blur value of the identified first object with the determined average blur value. The blur value calculator 206 may be configured to determine the identified first object as the blur object based on the comparison. The blur value calculator 206 may be configured to determine a second blur value of the first object in the captured second image. The blur value calculator 206 may be configured to compare the determined second blur value with at least one of a blur threshold value or an average blur value corresponding to the first plurality of objects. The processor 202 may be configured to crop the first object from the captured second image based on the comparison. The processor 202 may be configured to replace the first object in the first image with the first object cropped from the second image. The processor 202 may be configured to crop the first object from the captured second image based on the determined second blur value higher than at least one of the blur threshold or the average blur value.

The processor 202 may be configured to determine a position of the first object in the first image. The processor 202 may be configured to identify the first object in the captured second image based on the determined position. The processor 202 may be configured to stitch the first object (cropped from the captured second image) on the first image at the determined position to replace the first object in the first image. The processor 202 may be configured to generate the output image based on the stitch.

The processor 202 may be configured to determine a position of the first object in the first image. The focal length controller 208 may be configured to adjust the focal point of the image capture device 106 to focus on the determined position. The processor 202 may be configured to control the image capture device 106 to capture the second image focused on the determined position.

The processor 202 may be configured to identify the first plurality of objects in the first image. The processor 202 may be configured to classify each first object of the identified first plurality of objects into an object type. The processor 202 may be configured to determine blur values of the first plurality of objects. The processor 202 may be configured to sort the determined blur values of the first plurality of objects based on the object type. The processor 202 may be configured to determine the identified first plurality of objects as blur objects based on the sorted blur values. The processor 202 may be configured to assign a higher priority to a third blur value of a fourth object of the first plurality of objects as compared to other objects of the first plurality of objects. The object type of the fourth object is human object type.

The processor 202 may be configured to receive a second user input for selection of a specific mode associated with the image capture device 106. The processor 202 may be configured to control the display screen 104 to display a preview image corresponding to the first image. The preview image is displayed based on the selection of the specific mode. The preview image may comprise a second plurality of objects. The processor 202 may be configured to control the display screen to display a user interface (UI). The UI may comprise a third UI element configured to receive a fifth user input for selection of one or more object types of the second plurality of objects included in the preview image. The first plurality of objects may correspond to the selected one or more object types of the second plurality of objects.

In accordance with an embodiment, the image processing device 102 may further include a memory (such as memory 210 of FIG. 2). The processor 202 may be configured to store the captured first image and the captured second image in the memory. In response to a sixth user input to select the stored first image, the processor 202 may be further configured to replace the first object in the first image with the first object in the stored second image to generate the output image.

Various embodiments of the disclosure may provide a non-transitory, computer readable medium and/or storage medium, and/or a non-transitory machine readable medium and/or storage medium stored thereon, a machine code and/or a computer program with at least one code section executable by a machine and/or a computer for controlling a display screen to display an output image of a scene by the image processing device 102 based on adjustment of a focal point of the image capture device 106 to focus on blur objects in the scene. The at least one code section may cause the machine and/or computer to perform the operations that comprise controlling the image capture device 106 that comprises a first preview of the scene 108 to be captured by an image capture device 106. The first preview of the scene comprises at least the first object 110. The at least one code section in the image processing device 102 may cause the machine and/or computer to perform the operations that comprise identification of an object, such as the first object from a first plurality of objects in the first image of the scene 108. The at least one code section in the image processing device 102 may cause the machine and/or computer to perform the operations that further comprise determining a first blur value of the identified first object and determine the identified first object as a blur object based on the first blur value. The at least one code section in the image processing device 102 may cause the machine and/or computer to perform the operations that further comprise controlling the image capture device 106 to capture a second image of the first object based on the adjusted focal point. The at least one code section in the image processing device 102 may cause the machine and/or computer to perform the operations that further comprise replacing the first object in the first image with the second image of the first object to generate an output image. The at least one code section in the image processing device 102 may cause the machine and/or computer to perform the operations that further comprise controlling the display screen 104 to display the output image.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other devices adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. An image processing device, comprising:
a processor configured to:
control an image capture device to capture a first image, wherein the first image is captured based on a first user input;
identify a first object from a first plurality of objects in the first image;
determine a first blur value of the identified first object;
determine the identified first object as a blur object based on the determined first blur value;
adjust a focal point of the image capture device to focus on the blur object;
control the image capture device to capture a second image that includes the first object,
wherein the second image is captured based on the adjusted focal point;
determine a second blur value of the first object in the captured second image;
compare the determined second blur value with at least one of a first blur threshold value or an average blur value,
wherein the average blur value corresponds to the first plurality of objects;
crop the first object from the captured second image based on the comparison of the determined second blur value with the at least one of the first blur threshold value or the average blur value;
replace the first object in the first image with the first object cropped from the captured second image;
generate an output image based on the replacement of the first object in the first image with the first object cropped from the captured second image; and
control a display screen to display the output image.

2. The image processing device according to claim 1, wherein the processor is further configured to:
receive a second user input for selection of a specific mode associated with the image capture device;
control the display screen to display a user interface (UI) based on the selection of the specific mode,
wherein the UI comprises a first UI element configured to receive a third user input for selection of at least one object type of a second plurality of objects; and
control the display screen to display a preview image corresponding to the first image, wherein
the preview image comprises the second plurality of objects selected based on the third user input for the selection of the at least one object type.

3. The image processing device according to claim 2, wherein the processor is further configured to:
control the display screen to display an identifier corresponding to each second object of the second plurality of objects displayed in the preview image, wherein the identifier indicates a level of blur of each second object of the second plurality of objects; and control the display screen to display a second UI element corresponding to at least one second object of the second plurality of objects displayed in the preview image,
wherein the second UI element is configured to receive a fourth user input for removal of a third object the second plurality of objects,
the removal of the third object is based on the level of blur indicated by the identifier, and
the first plurality of objects corresponds to the second plurality of objects other than the removed third object.

4. The image processing device according to claim 1, wherein the processor is further configured to:
compare the determined first blur value of the identified first object with a second blur threshold value; and
determine the identified first object as the blur object based on the comparison of the determined first blur value of the identified first object with the second blur threshold value.

5. The image processing device according to claim 1, wherein the processor is further configured to:
determine the average blur value corresponding to the first plurality of objects;
compare the determined first blur value of the identified first object with the determined average blur value; and
determine the identified first object as the blur object based on the comparison of the determined first blur value of the identified first object with the determined average blur value.

6. The image processing device according to claim 1, wherein the processor is further configured to crop the first object from the captured second image based on the determined second blur value that is higher than the at least one of the first blur threshold value or the average blur value.

7. The image processing device according to claim 1, wherein the processor is further configured to:
determine a position of the first object in the first image;
identify the first object in the captured second image based on the determined position;
stitch the first object cropped from the captured second image on the first image at the determined position to replace the first object in the first image; and
generate the output image based on the stitch.

8. The image processing device according to claim 1, wherein the processor is further configured to:
determine a position of the first object in the first image;
adjust the focal point of the image capture device to focus on the determined position; and
control the image capture device to capture the second image focused on the determined position.

9. The image processing device according to claim 1, wherein the processor is further configured to:
identify the first plurality of objects in the first image;
classify each first object of the identified first plurality of objects into an object type;
determine blur values of the first plurality of objects;
sort the determined blur values of the first plurality of objects based on the object type; and
determine the identified first plurality of objects as blur objects based on the sorted blur values.

10. The image processing device according to claim 9, wherein the processor is further configured to assign a higher priority to a third blur value of a fourth object of the first plurality of objects as compared to other objects of the first plurality of objects, and
the object type of the fourth object is human.

11. The image processing device according to claim 1, wherein the processor is further configured to:
   receive a second user input for selection of a specific mode associated with the image capture device;
   control the display screen to display a preview image corresponding to the first image, wherein the preview image is displayed based on the selection of the specific mode, and wherein the preview image comprises a second plurality of objects; and
   control the display screen to display a user interface (UI),
      the UI comprises a third UI element configured to receive a fifth user input for selection of at least one object type of the second plurality of objects included in the preview image, and
      the first plurality of objects corresponds to the selected at least one object type of the second plurality of objects.

12. The image processing device according to claim 1, further comprising a memory, wherein the processor is further configured to:
   store the captured first image and the captured second image in the memory;
   in response to a sixth user input to select the stored first image, replace the first object in the first image with the first object in the stored second image; and
   generate the output image based on the replacement of the first object in the first image with the first object in the stored second image.

13. An image processing method, comprising:
   in an image processing device which comprises a processor:
      controlling, by the processor, an image capture device to capture a first image, wherein the first image is captured based on a first user input;
      identifying, by the processor, a first object from a first plurality of objects in the first image;
      determining, by the processor, a first blur value of the identified first object;
      determining, by the processor, the identified first object as a blur object based on the determined first blur value;
      adjusting, by the processor, a focal point of the image capture device to focus on the blur object;
      controlling, by the processor, the image capture device to capture a second image that includes the first object,
         wherein the second image is captured based on the adjusted focal point;
      determining, by the processor, a second blur value of the first object in the captured second image;
      comparing, by the processor, the determined second blur value with at least one of a first blur threshold value or an average blur value,
         wherein the average blur value corresponds to the first plurality of objects;
      cropping, by the processor, the first object from the captured second image based on the comparison of the determined second blur value with the at least one of the first blur threshold value or the average blur value;
      replacing, by the processor, the first object in the first image with the first object cropped from the captured second image;
      generating, by the processor, an output image based on the replacement of the first object in the first image with the first object cropped from the captured second image; and
      controlling, by the processor, a display screen to display the output image.

14. The image processing method according to claim 13, further comprising:
   receiving, by the processor, a second user input for selection of a specific mode associated with the image capture device;
   controlling, by the processor, the display screen to display a user interface (UI) based on the selection of the specific mode,
      wherein the UI comprises a first UI element configured to receive a third user input for selection of at least one object type of a second plurality of objects; and
   controlling, by the processor, the display screen to display a preview image corresponding to the first image, wherein
      the preview image comprises the second plurality of objects selected based on the third user input for the selection of the at least one object type.

15. The image processing method according to claim 14, further comprising:
   controlling, by the processor, the display screen to display an identifier corresponding to each second object of the second plurality of objects displayed in the preview image, wherein the identifier indicates a level of blur of each second object of the second plurality of objects; and
   controlling, by the processor, the display screen to display a second UI element corresponding to each second object of the second plurality of objects displayed in the preview image, wherein
      the second UI element is configured to receive a fourth user input for removal of a third object from the second plurality of objects,
      the removal of the third object is based on the level of blur indicated by the identifier, and
      the first plurality of objects corresponds to the second plurality of objects other than the removed third object.

16. The image processing method according to claim 13, further comprising:
   determining, by the processor, a position of the first object in the first image;
   identifying, by the processor, the first object in the captured second image based on the determined position;
   stitching, by the processor, the first object cropped from the captured second image on the first image at the determined position to replace the first object in the first image; and
   generating, by the processor, the output image based on the stitching.

17. The image processing method according to claim 14, further comprising:
   identifying, by the processor, the first plurality of objects in the first image;
   classifying, by the processor, each first object of the identified first plurality of objects into an object type;
   determining, by the processor, blur values of the first plurality of objects;
   sorting, by the processor, the determined blur values of the first plurality of objects based on the object type; and
   determining, by the processor, the identified first plurality of objects as blur objects based on the sorted blur values.

18. The image processing method according to claim 14, further comprising:

comparing the determined first blur value of the identified first object with a second blur threshold value; and determining the identified first object as the blur object based on the comparison of the determined first blur value of the identified first object with the second blur threshold value.

19. An image processing device, comprising:
a processor configured to:
  control an image capture device to capture a first image, wherein the first image is captured based on a user input;
  identify a fist plurality of objects in the first image;
  classify each first object of the identified first plurality of objects into an object type;
  determine blur values of the identified first plurality of objects;
  sort the determined blur values of the identified first plurality of objects based on the object type;
  determine the identified first plurality of objects as blur objects based on the sorted blur values;
  adjust focal points of the image capture device to focus on the blur objects;
  control the image capture device to capture a plurality of second images, wherein
    each second image of the plurality of second images includes a corresponding first object of the first plurality of objects, and
    the plurality of second images is captured based on the adjusted focal points;
  replace each first object of the identified first plurality of objects in the first image with the corresponding first object in each second image of the plurality of second images;
  generate an output image based on the replacement of each first object of the identified first plurality of objects in the first image with the corresponding first object in each second image of the plurality of second images; and
  control a display screen to display the output image.

* * * * *